(12) United States Patent
Xiao et al.

(10) Patent No.: US 12,386,208 B1
(45) Date of Patent: Aug. 12, 2025

(54) LENS WITH WATER RESISTANCE AND EYEGLASS

(71) Applicant: SHENZHEN CRYSTAL-STAR TECH CO., LTD, Guangdong (CN)

(72) Inventors: Zeyu Xiao, Guangdong (CN); Fei Xie, Guangdong (CN); Jiuqing Huang, Guangdong (CN)

(73) Assignee: SHENZHEN CRYSTAL-STAR TECH CO., LTD, Shenzhen (CN)

( * ) Notice: Subject to any disclaimer, the term of this patent is extended or adjusted under 35 U.S.C. 154(b) by 0 days.

(21) Appl. No.: 19/071,282

(22) Filed: Mar. 5, 2025

Related U.S. Application Data

(63) Continuation of application No. PCT/CN2024/120001, filed on Sep. 20, 2024.

Foreign Application Priority Data

Jul. 27, 2024 (CN) ............ 202411016333.3

(51) Int. Cl.
*G02C 11/08* (2006.01)
*G02B 1/18* (2015.01)

(52) U.S. Cl.
CPC ............ *G02C 11/08* (2013.01); *G02B 1/18* (2015.01)

(58) Field of Classification Search
CPC ................. G02C 11/08; G02B 1/18
USPC ................................. 351/41, 62
See application file for complete search history.

(56) References Cited

U.S. PATENT DOCUMENTS

| | | | | |
|---|---|---|---|---|
| 10,534,199 | B2* | 1/2020 | Ohkubo | G02B 5/305 |
| 2009/0079934 | A1* | 3/2009 | Su | B29D 11/00644 351/159.56 |
| 2011/0122493 | A1* | 5/2011 | Ogawa | G02B 1/14 264/1.36 |
| 2015/0158259 | A1* | 6/2015 | Yamamoto | B29D 11/00644 264/1.32 |

\* cited by examiner

*Primary Examiner* — Tuyen Tra
(74) *Attorney, Agent, or Firm* — HOWARD M COHN and Associates, LLC

(57) ABSTRACT

The present disclosure relates to the field of optical lenses, and in particular, to a lens with water resistance and an eyeglass. The lens with water resistance includes a substrate layer, an adhesive, and a polarized lens. The substrate layer is made of a polycarbonate film material, the adhesive is a light-curing resin adhesive, and is provided between the substrate layer and the polarized lens, so as to enable the substrate layer bonded to the polarized lens. In the lens with water resistance provided in the present disclosure, the polycarbonate film material is used as the substrate material instead of the conventional cellulose triacetate substrate material, and the light-curing resin adhesive is used instead of the conventional water-based adhesive, such that the problem of poor water waterproofness of polarized eyeglasses of the conventional multilayered laminating can be improved.

8 Claims, 4 Drawing Sheets

LENS WITH WATER RESISTANCE AND EYEGLASS

TECHNICAL FIELD

The present disclosure relates to the field of optical lenses, and in particular, to a lens with water resistance and an eyeglass.

BACKGROUND

Existing lenses for polarized spectacles are basically divided into a multilayer laminating type using cellulose triacetate as a substrate, and an injection molding or casting type using a polymer resin.

As the lenses for polarized spectacle of the multilayer laminating type using cellulose triacetate as the substrate are affordable, they are widely used in the market. However, due to the lamination by using water-based adhesive and polarized base film, and the enhanced water absorption and water permeability of cellulose triacetate, it is easy to moisture absorption phenomenon in a humid environment, such that the water molecules penetrate the cellulose triacetate and react with the water-based adhesive, resulting in deteriorating the adhesion of the water-based adhesive, which led to the problem of the material delamination, and this is an intolerable fatal defect for lenses. The product has been introduced for decades without any qualitative improvement.

The injection-molded materials, such as nylon polarizer, PC polarizer, or infused CR39 polarizer and the like, are not prone to water absorption and delamination, but their prices are several times higher than the polarized lenses using cellulose triacetate as the substrate.

SUMMARY

The present disclosure provides a lens with water resistance and an eyeglass, in order to solve the problem of poor water resistance possessed by the polarized eyeglass with a conventional multilayer lamination type.

In order to solve the above technical problem, one technical solution adopted in the present disclosure is to provide a lens with water resistance and an eyeglass, the lens with water resistance comprising:

a substrate layer, an adhesive, and a polarized lens laminated sequentially;

the substrate layer is made of a polycarbonate film material, the adhesive is a light-curing resin adhesive, and the adhesive is provided between the substrate layer and the polarized lens, such that the substrate layer is bonded to the polarized lens.

Optionally, the light-curing resin adhesive comprises a resin, a prepolymer, an active monomer, a photoinitiator, and an additive.

Optionally, the prepolymer is a mixture of one or more selected from a group consisting of a polyolefin acrylate, an epoxy acrylate, a polyurethane acrylate, and a polyester acrylate.

Optionally, the active monomer is selected from a group consisting of an amide material, an isobornyl acrylate, and a phosphoric acrylate.

Optionally, in the light-curing resin adhesive, the prepolymer has a mass percentage ranging from 20% to 70%, the active monomer has a mass percentage ranging from 20% to 80%, the photoinitiator has a mass percentage ranging from 1% to 5%, and the additives has a mass percentage ranging from 1% to 10%.

Optionally, a surface of the substrate layer is provided with one or more of a hardened coating, a transmission-enhancing coating, a reflective coating, an antistatic coating, and an anti-fingerprint coating.

Optionally, the photoinitiator comprises a general photoinitiator and a deep photoinitiator; a material of the general photoinitiator is 1-hydroxycyclohexyl phenyl ketone, and a material of the deep photoinitiator is 2,4,6-trimethylbenzoyl-diphenylphosphine oxide.

Optionally, the lens with water resistance further comprises a tinted lens; the lens with water resistance is compounded in a form of: the substrate layer, the adhesive, the tinted lens, and the polarized lens laminated and compounded in sequence.

Optionally, the lens with water resistance is compounded in a form of: the substrate layer, the adhesive, the polarized lens, the adhesive, and the substrate layer laminated and compounded in sequence.

The present disclosure further provides an eyeglass comprising an eyeglass frame and the lens with water resistance as described above.

The present disclosure has beneficial effects below:

In the lens with water resistance provided in the present disclosure, a polycarbonate film material is adopted as the substrate to replace a conventional cellulose triacetate substrate, and a light-curing resin adhesive is adopted to replace a conventional water-based adhesive, which improves the problem of poor waterproofness of polarized eyeglasses of the conventional multilayered laminating type.

BRIEF DESCRIPTION OF DRAWINGS

In order to more clearly illustrate the technical solutions in the embodiments according to the present disclosure, the figures to be used in the description of the embodiments will be briefly introduced below. It will be obvious that the figures in the following description are used as some of the embodiments according to the present disclosure, and for the person skilled in the field, other figures can be obtained according to these figures without inventive efforts Among them.

REFERENCE SIGNS

Figure 1:
FIG. 1 is a schematic diagram illustrating a structure of an eyeglass made of a six-layer material provided by embodiments according to the present disclosure.

100, first polycarbonate film material; 200, second polycarbonate film material; 300, first light-curing resin adhesive; 400, second light-curing resin adhesive; 500, polarized lens; 600, tinted lens.

DESCRIPTION OF EMBODIMENTS

The technical solutions in the embodiments according to the present disclosure will be described clearly and completely in the following in conjunction with the figures in the embodiments according to the present disclosure. It is obvious that the described embodiments are only a part of the embodiments according to the present disclosure and not present all of the embodiments. Based on the embodiments in the present disclosure, all other embodiments obtained by persons of ordinary skill in the art without inventive efforts fall within the present disclosure.

It should be noted that if the embodiments according to the present disclosure involve directional indications (such as up, down, left, right, front, back and the like), such directional indications are only used to explain the relative positional relationship, movement, etc., among the various components in a particular attitude (as shown in the figures), and if the particular attitude is changed, the directional indications are also changed accordingly.

Furthermore, if the embodiments according to the present disclosure contain descriptions involving "first", "second", and the like, the descriptions of "first", "second", and the like are used only for descriptive purposes, and are not to be understood as indicating or implying their relative importance or implicitly specifying the number of the indicated technical features. As a result, a feature defined with "first" or "second" may include at least one such feature either explicitly or implicitly. In addition, the technical solutions between the various embodiments may be combined with each other, but it must be based on the fact that a person of ordinary skill in the art is able to realize them, and when the combination of technical solutions appears to be contradictory or unattainable, it should be considered that the combination of such technical solutions does not exist, and is not within the protection of the claims according to the present disclosure.

In the following embodiments, for all of the peeling tests, each material adopted is 25 mm in width and about 200 mm in length.

The present disclosure provides a lens with water resistance, the lens with water resistance comprising a substrate layer, an adhesive and a polarized lens laminated sequentially. The substrate layer is made of a polycarbonate film material, the adhesive is a light-curing resin adhesive, and is provided between the substrate layer and the polarized lens, so as to enable the substrate layer bond to the polarized lens for lamination.

The light-curing resin adhesive includes a UV resin, a prepolymer, an active monomer, a photoinitiator, and an additive. The prepolymer is a mixture of one or more selected from a group consisting of polyolefin acrylates, epoxy acrylates, urethane acrylates, and polyester acrylates.

In the light-curing resin adhesive, the mass percentage of the prepolymeris ranges from 20% to 60%, the mass percentage of the active monomer ranges from 20% to 80%, the mass percentage of the photoinitiator ranges from 1% to 5%, and the mass percentage of the additives ranges from 1% to 10%.

The active monomer is an amide material or an isobornyl acrylate or a phosphate acrylate. The photoinitiator includes a general photoinitiator and a deep photoinitiator, and the material of the general photoinitiator is 1-hydroxycyclohexyl phenyl ketone, and the material of the deep photoinitiator is 2,4,6-trimethylbenzoyl-diphenylphosphine oxide. The additive is a silicone-free acrylate defoamer.

The surface of the substrate layer is provided with one or more selected from a group consisting of a hardened coating, a transmission-enhancing coating, a reflective coating, an antistatic coating, and an anti-fingerprint coating.

In a specific embodiment, the components in the light-curing resin adhesive are listed below:

| | Use | Material Name | Mass Percentage |
|---|---|---|---|
| Material Formula | Resin | Polycarbonate-type polyurethane acrylate | 30% |
| | Prepolymer | Polyurethane acrylate | 33% |
| | Active monomer 1 | Isobornyl acrylate | 17% |
| | Active monomer 2 | Phosphoric acrylate | 15% |
| | General photoinitiator | 1-hydroxycyclohexyl phenyl ketone | 3% |
| | Deep photoinitiator | 2,4,6-trimethylbenzoyl-diphenylphosphine oxide | 1.8% |
| | Additives | Non-silicone defoamer | 0.2% |

The light-curing resin adhesive described above is uniformly coated on an A4-sized polycarbonate film material with a scraping device, and then the polarized lens is pasted together with the polycarbonate film material, and irradiated by a UV lamp to cause the light-curing resin adhesive to solidify such as to form the first experimental group.

In another specific embodiment, the components in the light-curing resin adhesive are listed below:

| | Use | Material Name | Mass Percentage |
|---|---|---|---|
| Material Formula | Resin | Polycarbonate-type polyurethane acrylate | 43% |
| | Prepolymer | Polyurethane acrylate | 33% |
| | Active monomer 1 | Isobornyl acrylate | 17% |
| | Active monomer 2 | Phosphoric acrylate | 15% |
| | General photoinitiator | 1-hydroxycyclohexyl phenyl ketone | 3% |
| | Deep photoinitiator | 2,4,6-trimethylbenzoyl-diphenylphosphine oxide | 1.3% |
| | Additives | Non-silicone defoamer | 0.2% |

The light-curing resin adhesive described above is uniformly coated on an A4-sized polycarbonate film material with a scraping device, and then the polarized lens is pasted together with the polycarbonate film material, and irradiated by a UV lamp to cause the light-curing resin adhesive to solidify such as to form the second experimental group.

In yet another specific embodiment, the components in the light-curing resin adhesive are listed below:

| | Use | Material Name | Mass Percentage |
|---|---|---|---|
| Material Formula | Resin | Polycarbonate-type polyurethane acrylate | 20% |
| | Prepolymer | Polyurethane acrylate | 60% |
| | Active monomer 1 | Isobornyl acrylate | 10% |
| | Active monomer 2 | Phosphoric acrylate | 5% |
| | General photoinitiator | 1-hydroxycyclohexyl phenyl ketone | 3% |
| | Deep photoinitiator | 2,4,6-trimethylbenzoyl-diphenylphosphine oxide | 1.8% |
| | Additives | Non-silicone defoamer | 0.2% |

The light-curing resin adhesive described above is uniformly coated on an A4-sized polycarbonate film material with a scraping device, and then the polarized lens is pasted together with the polycarbonate film material, and irradiated by a UV lamp to cause the light-curing resin adhesive to solidify such as to form the third experimental group.

The lenses of the first experimental group, the second experimental group, and the third experimental group are sliced into 25 mm width and about 200 mm length, and placed in brine with a NaCl content of 5.6%. The peel force of each experimental group is tested by using the 90-degree peeling method, and the experimental data are listed below:

| Soaking time in brine (H) | First experimental group Peel force | Second experimental group Peel force | Third experimental group Peel force |
|---|---|---|---|
| Brine at room temperature (with a NaCl content of 5.6%) | 1 | 60.2N | 46.1N | 37.7N |
| | 2 | 58.6N | 45.6N | 34.6N |
| | 3 | 50.4N | 45.1N | 31.8N |
| | 6 | 47.3N | 44.1N | 33.6N |
| | 9 | 48.5N | 34.8N | 28.6N |
| | 12 | 40.2N | 34.5N | 27.3N |
| | 24 | 29.6N | 18.2N | 20.2N |
| | 36 | 25.2N | 20.2N | 12.6N |
| | 72 | 20.8N | 13.3N | 5.3N |
| Appearance | After experimented | Good transparency | Good transparency | Not good transparency, with a white state |

CONCLUSION: When the composition ratio of the light-curing resin adhesive is different, the water resistance of the obtained products will be different, and when the light-curing resin adhesive adopts the material formulation as in the first experimental group, the obtained lenses have better water resistance.

The water-based adhesive is uniformly coated on an A4-sized cellulose triacetate film material with a scraping device, and then the polarized lens is pasted together with the cellulose triacetate film material, and put into an oven at a constant temperature of 80° C. to bake for 30 minutes, then turned to 50° C. to bake for 24 hours more in order to form a control group.

The first experimental group and the control group described above a subjected to peel force experiments using the 180-degree peeling method, and the experimental data are shown in the table below:

| Experimental conditions | Soaking in deionized water at a constant temperature of 80°C, (with a NaCl content of 5.6%) | |
|---|---|---|
| | Peel force of the first experimental group (unit: N) | Peel force of the control group (unit: N) |
| Before experiment | 86.94 | 27.34 |
| After 10 minutes | 75.3 | 26.16 |
| After 20 minutes | 77.28 | 25.64 |
| After 30 minutes | 77.54 | 24.3 |
| After 40 minutes | 75.08 | 22.35 |
| After 50 minutes | 69.72 | 20.36 |
| After 60 minutes | 67.76 | 15.24 |
| After 70 minutes | 62.18 | 13.76 |
| After 80 minutes | 63.5 | 14.28 |
| After 90 minutes | 60.22 | 12.37 |
| After 100 minutes | 58.66 | 9.71 |
| After 110 minutes | 57.63 | 7.58 |
| After 120 minutes | 55.32 | 6.31 |
| Degree of attenuation (vs. peel force results after 10 minutes of soaking) | 26.53% | 75.88% |

CONCLUSION: The peel force of the first experimental group using light-curing resin adhesive and polycarbonate film material shows an attenuation of 26.53% after 120 minutes of soaking in water compared to the value after 10 minutes of soaking. And the peel force of the control group using cellulose triacetate film material of the water-based adhesive shows an attenuation of 75.88% after 120 minutes of soaking in water compared to the peel force after 10 minutes of soaking. Therefore, the water resistance of the first experimental group using the light-curing resin adhesive and the polycarbonate film material is superior to the water resistance of the control group using the cellulose triacetate film material of the water-based adhesive.

In another specific embodiment, the components in the light-curing resin adhesive are listed below:

| Material | Use | Material Name | Mass Percentage |
|---|---|---|---|
| Material Formula | Resin 1 | Epoxy acrylate | 31% |
| | Resin 2 | 6-functional polyurethane acrylate | 30% |
| | Active monomer 1 | Tetrahydrofuran acrylate THFA | 10.8% |
| | Active monomer 2 | Diethyl acrylamide DEAA | 23% |
| | General photoinitiator | 1-hydroxycyclohexyl phenyl ketone | 3% |
| | Deep photoinitiator | 2,4,6-trimethylbenzoyl-diphenylphosphine oxide | 2% |
| | Additives | Non-silicone defoamer | 0.2% |

In another specific embodiment, the components in the light-curing resin adhesive are listed below:

| Material | Use | Material Name | Mass Percentage |
|---|---|---|---|
| Formula | Resin 1 | Modified urethane acrylate | 40% |
| | Resin 2 | Epoxy acrylate | 20% |
| | Active monomer 1 | Isobornyl acrylate (IBOA) | 17% |
| | Active monomer 2 | Dimethylacrylamide DMAA | 8% |
| | Active monomer 3 | Tetrahydrofuran acrylate THFA | 9.998% |
| | General photoinitiator | 1-hydroxycyclohexyl phenyl ketone | 2% |
| | Deep photoinitiator | 2,4,6-trimethylbenzoyl-diphenylphosphine oxide | 3% |
| | Additives | Non-silicone defoamer | 0.20% |

Based on the above light-curing resin adhesive and polycarbonate film material having good water resistance, the present disclosure also provides an eyeglass.

Specific Embodiment 1

The embodiment according to the present disclosure provides an eyeglass including an eyeglass frame and a lens, and the lens is fixedly assembled in the eyeglass frame. As shown in FIG. 1, and the lens is made of six layers of material, the six layers of material being a layer of a first polycarbonate film material 100, a layer of a second polycarbonate film material 200, a layer of a first light-curing resin adhesive 300, a layer of a second light-curing resin adhesive 400, a layer of a polarized lens 500, and a layer of a tinted lens 600, respectively.

Among them, the first polycarbonate film 100 and the second polycarbonate film 200 are spaced apart, the polarized lens 500 and the tinted lens 600 are provided between the first polycarbonate film 100 and the second polycarbonate film 200, and the first light-curing resin adhesive 300 is provided between the polarized lens 500 and the first polycarbonate film 100, such that the first polycarbonate film 100 and the polarized lens 500 are adhesived. The second light-curing resin adhesive 400 is provided between the second polycarbonate film material 200 and the tinted lens 600, causing the second polycarbonate film material 200 and the tinted lens 600 to be adhesived.

Specific Embodiment 2

Figure 2:
FIG. 2 is a schematic diagram illustrating a structure of an eyeglass made of a four-layer material provided by embodiments according to the present disclosure.

The embodiment according to the present disclosure provides an eyeglass comprising an eyeglass frame and a lens, and the lens is fixedly assembled in the eyeglass frame. As shown in FIG. 2, and the lens is made of four layers of material, the four layers of material being a layer of a polarized lens 500, a layer of a tinted lens 600, a layer of a first light-curing resin adhesive 300, and a layer of a first polycarbonate film material 100, respectively.

Among them, the tinted lens 600 is provided on one side of the first polycarbonate film material 100, the polarized lens 500 is provided on the side, away from the first polycarbonate film material 100, of the tinted lens 600, and the first light-curing resin adhesive 300 is provided between the tinted lens 600 and the first polycarbonate film material 100, causing the tinted lens 600 and the polycarbonate film material to be adhesived.

Specific Embodiment 3

Figure 3:
FIG. 3 is a schematic diagram illustrating a structure of an eyeglass made of a five-layer material provided by embodiments according to the present disclosure.

The embodiment according to the present disclosure provides an eyeglass comprising an eyeglass frame and a lens, and the lens is fixedly assembled in the eyeglass frame. As shown in FIG. 3, and the lens is made of five layers of material, the five layers of material being a layer of a first polycarbonate film material 100, a layer of a first light-curing resin adhesive 300, a layer of a polarized lens 500, a layer of a second light-curing resin adhesive 400, and a layer of a second carbonate film material, respectively.

Among them, the first polycarbonate film 100 and the second carbonate film are provided in a parallel spacing manner, the polarized lens 500 is provided between the first polycarbonate film 100 and the second carbonate film, and the first light-curing resin adhesive 300 is provided between the first polycarbonate film 100 and the polarized lens 500, so as to enable the first polycarbonate film 100 and the polarized lens 500 to be adhesived. The second light-curing resin adhesive 400 is provided between the second polycarbonate film material and the polarized lens 500, causing the second polycarbonate film material and the polarized lens 500 to be adhesived.

Specific Embodiment 4

Figure 4:
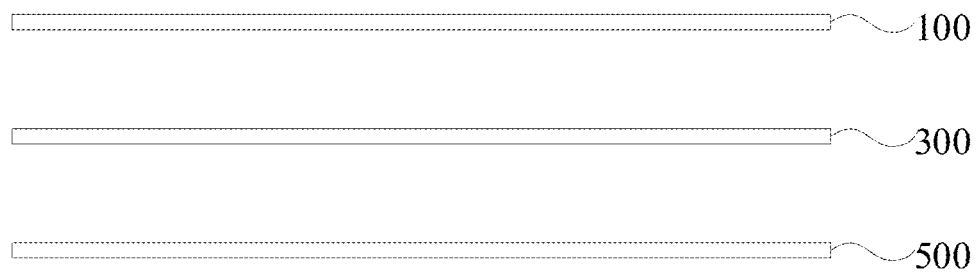
FIG. 4 is a schematic diagram illustrating a structure of the eyeglasses made of a three-layer material provided by embodiments according to the present disclosure.

The embodiment according to the present disclosure provides an eyeglass comprising an eyeglass frame and a lens, and the lens is fixedly assembled in the eyeglass frame. As shown in FIG. 4, and the lens is made of three layers of material, the three layers of material being a layer of a first polycarbonate film material 100, a layer of a first light-curing resin adhesive 300, and a layer of a polarized lens 500, respectively.

Among them, the polarized lens 500 and the polycarbonate film material are provided in a parallel spacing manner, and the first light-curing resin adhesive 300 is provided between the polarized lens 500 and the first polycarbonate film material 100, so as to enable the polarized lens 500 and the first polycarbonate film material 100 to be adhesived.

The above are all preferred embodiments according to the present disclosure, and are not intended to limit the protection of the present disclosure accordingly. For those skilled in the art, a variety of changes, modifications, substitutions, and variations can be made to these embodiments without departing from the principles and spirit of the present disclosure. Therefore, all equivalent changes made according to the structure, shape and principle of the present disclosure shall be covered by the protection of the present disclosure

What is claimed is:

1. A lens with water resistance, comprising: a substrate layer, an adhesive, and a polarized lens laminated sequentially;
   wherein the substrate layer is made of a polycarbonate film material, the adhesive is a light-curing resin adhesive, and the adhesive is provided between the substrate layer and the polarized lens, such that the substrate layer is bonded to the polarized lens;
   wherein the light-curing resin adhesive comprises a resin, a prepolymer, an active monomer, a photoinitiator, and an additive;
   wherein the prepolymer is a mixture of one or more selected from a group consisting of a polyolefin acrylate, an epoxy acrylate, a polyurethane acrylate, and a polyester acrylate; and
   wherein the active monomer is selected from a group consisting of an amide material, an isobornyl acrylate, and a phosphoric acrylate.

2. The lens with water resistance according to claim 1, wherein in the light-curing resin adhesive, the prepolymer has a mass percentage ranging from 20% to 70%, the active monomer has a mass percentage ranging from 20% to 80%, the photoinitiator has a mass percentage ranging from 1% to 5%, and the additives has a mass percentage ranging from 1% to 10%.

3. The lens with water resistance according to claim 2, wherein a surface of the substrate layer is provided with one or more of a hardened coating, a transmission-enhancing coating, a reflective coating, an antistatic coating, and an anti-fingerprint coating.

4. The lens with water resistance according to claim 3, wherein the photoinitiator comprises a general photoinitiator and a deep photoinitiator; a material of the general photoinitiator is 1-hydroxycyclohexyl phenyl ketone, and a material of the deep photoinitiator is 2,4,6-trimethylbenzoyl-diphenylphosphine oxide.

5. The lens with water resistance according to claim 1, further comprising a tinted lens; wherein the lens with water resistance is compounded in a form of: the substrate layer, the adhesive, the tinted lens, and the polarized lens laminated and compounded in sequence.

6. The lens with water resistance according to claim 1, wherein the lens with water resistance is compounded in a form of: the substrate layer, the adhesive, the polarized lens, the adhesive, and the substrate layer laminated and compounded in sequence.

7. An eyeglass, comprising an eyeglass frame and the lens with water resistance according to claim 1.

8. A lens with water resistance, comprising: a substrate layer, an adhesive, and a polarized lens laminated sequentially;
   wherein the substrate layer is made of a polycarbonate film material, the adhesive is a light-curing resin adhesive, and the adhesive is provided between the substrate layer and the polarized lens, such that the substrate layer is bonded to the polarized lens;
   the lens with water resistance further comprises a tinted lens; wherein the lens with water resistance is compounded in a form of: the substrate layer, the adhesive, the tinted lens, and the polarized lens laminated and compounded in sequence.

* * * * *